US012247726B2

(12) United States Patent
Gadner et al.

(10) Patent No.: US 12,247,726 B2
(45) Date of Patent: Mar. 11, 2025

(54) SUPPORT RAILS FOR LUMINAIRES OR ELECTRICAL UNITS

(71) Applicant: ZUMTOBEL LIGHTING GMBH, Dornbirn (AT)

(72) Inventors: Wolfgang Gadner, Dornbirn (AT); Gerald Ladstätter, Dornbirn (AT)

(73) Assignee: Zumtobel Lighting GmbH, Dornbirn (AT)

(*) Notice: Subject to any disclaimer, the term of this patent is extended or adjusted under 35 U.S.C. 154(b) by 481 days.

(21) Appl. No.: 17/683,951

(22) Filed: Mar. 1, 2022

(65) Prior Publication Data

US 2022/0341574 A1 Oct. 27, 2022

(51) Int. Cl.

| | |
|---|---|
| ***H01R 13/641*** | (2006.01) |
| ***F21V 21/35*** | (2006.01) |
| ***H01R 25/16*** | (2006.01) |
| *F21V 21/02* | (2006.01) |

(52) U.S. Cl.
CPC ........... *F21V 21/35* (2013.01); *H01R 13/641* (2013.01); *H01R 25/162* (2013.01); *F21V 21/025* (2013.01)

(58) Field of Classification Search
None
See application file for complete search history.

(56) References Cited

U.S. PATENT DOCUMENTS

| | | | | |
|---|---|---|---|---|
| 5,419,715 A * | 5/1995 | Laveissiere | H01R 9/2683 | 439/491 |
| 7,329,131 B1 | 2/2008 | Chen | | |
| 2005/0000786 A1 | 1/2005 | Huang | | |
| 2006/0086530 A1* | 4/2006 | Knabel | H01R 25/16 | 174/135 |

FOREIGN PATENT DOCUMENTS

| | | | |
|---|---|---|---|
| CA | 2678609 | 3/2011 | |
| CN | 207052898 | 2/2018 | |
| DE | 112009000697 | 2/2011 | |
| DE | 102010016648 A1 * | 10/2011 | H02G 3/14 |
| DE | 102019108108 A1 * | 10/2019 | H01R 43/00 |
| DE | 202020100083 U1 * | 3/2020 | |
| DE | 102019126933 | 4/2021 | |
| DE | 102019126955 | 4/2021 | |
| DE | 112019003107 T5 * | 4/2021 | G06F 3/147 |
| EP | 2091111 | 8/2009 | |
| WO | 2001091250 | 11/2001 | |

OTHER PUBLICATIONS

EP21170057, Search Report dated Sep. 29, 2021, 2 pages.

* cited by examiner

*Primary Examiner* — Tho D Ta
(74) *Attorney, Agent, or Firm* — Andrus Intellectual Property Law, LLP

(57) ABSTRACT

A support rail for luminaires or electrical units (60) has a support rail profile (50), which encloses an elongated receiving space, along with at least one busbar (55), arranged in the receiving space, with contactable conductors (58), wherein the support rail (50) further has, on its outside, display means (10) for visually representing the function of the conductors (58).

13 Claims, 5 Drawing Sheets

SUPPORT RAILS FOR LUMINAIRES OR ELECTRICAL UNITS

CROSS-REFERENCE TO RELATED APPLICATION

The present application claims priority to European Patent Application 21170057.0 filed Apr. 23, 2021.

FIELD OF THE INVENTION

The present invention relates to a support rail for use in a support rail system, wherein the support rail has a support rail profile that encloses an elongated receiving space, along with at least one busbar with electrically contactable conductors, said busbar being arranged in the receiving space. Luminaires or other electrical units can then be connected to the support rail.

BACKGROUND OF THE INVENTION

Support rail systems with an elongated support profile rail and a busbar held in the support profile rail are known from the prior art and, for example, are used for realizing elongated so-called light strip systems. A known light strip system is marketed by the applicant under the designation "TECTON," and is characterized in that luminaires or other electrical units can be flexibly positioned on the support rail over the entire length of the system. This is made possible in that, due to a special mounting of the conductors of the busbar(s), these are accessible to users over substantially the entire length of the light strip system, so that a contacting of the conductors can take place not only at fixed, predetermined positions but rather at any point. Such a light strip system is shown in WO 2001/091250 A1, for example.

In the "TECTON" system mentioned above, two busbars are arranged opposite one another on the two side walls of a U-shaped support profile rail that is downwardly open. The contacting of the conductors of these two busbars takes place in that the luminaire, or generally speaking the load to be connected, has a rotatable contacting element that is inserted into the support profile rail from the underside into the support profile rail via the elongated coupling opening of the support profile rail, and is then rotated by approximately 45°. Contacts arranged at the contacting element are thereby designed in such a way that they are pivoted out laterally by rotation of the contacting element, and finally in the rotated state contact the conductors of the busbars. In addition, a mechanical latching also takes place at the same time so that the luminaire or the load is reliably fastened to the support rail.

At least a portion of the contacts of the known contacting element is thereby designed to be adjustable. This is achieved in that the contacting element ha a contact holder body that serves to retain the various contacts, wherein at least a portion of the contacts is mounted on the contact holder body so as to be height-adjustable, or can be arranged at different heights on the contact holder body. The possibility of a different height positioning of individual contacts thereby leads to the situation that these may be selected to selectively contact certain conductors of the busbar(s). For example, in this way there is the possibility to select, in a targeted manner, individual phases of a power supply network for contacting through the luminaire or the electrical unit.

SUMMARY OF THE INVENTION

Given this known support rail system, the use of the copper conductors of the busbars is normally defined in a fixed manner and correspondingly marked at the connection terminals of the unit to be connected, that is, the luminaire or the electrical unit. Insofar as optional connection options exist, for example given the aforementioned choice of the phase, this is normally described in the installation instructions, and it is the responsibility of the electrician installing the system to avoid errors in connecting the units.

However, the requirements of support rail systems are becoming ever more diverse. On the one hand, requirements are thereby increasing with respect to possible lighting-specific applications. For example, separate power supply circuits for emergency-luminaire lighting, or multiple communication circuits for comfortable lighting control are thus desired. On the other hand, there is an increasing desire for additional infrastructure elements to be integrated into the system.

Modern support rail systems therefore have an ever greater number of internally routed electrical conductors by which the functionality of the system that can be realized can be extended. In addition to the possibility of also providing, in addition to the general power supply, special emergency power supply circuits via which at least a portion of the luminaires can still be supplied with current as before in the event of an emergency, additional conductors are also used to transmit data or signals. This data transmission can then, for example, be used to control the individual connected luminaires from a central control station by means of digital commands. In addition, however, it has in the meantime become possible, or is also provided, to use individual conductors of the busbar independently of a lighting controller for the transmission of signals used in other ways. For example, within the scope of use of a 100V voltage to transmit digital acoustic signals, conductors could be used to enable loudspeakers or other suitable devices for reproducing the acoustic information to then be connected to the corresponding conductor pair. The use of conductors for signal transmission within the framework of a power-line carrier method would also be conceivable, in order to use at least a portion of the conductors of the busbar as a communication network for general information transmission.

However, providing dedicated circuits for all of these conceivable applications or functions would not make sense. The design of the system and the load to be connected would hereby become significantly more complicated and result in markedly increased manufacturing costs.

The present invention is therefore based firstly on the idea of making the available conductors of a support rail system usable in a customer-specific manner, at least in part. Depending on how the user thus employs the system, and which functionalities he would like to use, the conductors of the busbar(s) will thus be used in different ways for different types of signals. In this case, however, the problem arises that the risk of incorrectly contacting the conductors is markedly increased.

The present invention is therefore based on the object of avoiding defective applications or incorrect contacting of conductors to the greatest extent possible in a system of the type described above and, in particular, to exclude errors in relation to valid regulations regarding contacting the conductors.

The object is achieved by a support rail having the features of independent claim 1. Advantageous developments of the invention are the subject-matter of the dependent claims.

The core idea of the present invention is to visualize the at least partially flexible use of the conductors, in particular to make them visible at any time on the outside of the support rail system so that, upon connection of corresponding luminaires or other electrical units, which function has been assigned to which conductors of the system is immediately apparent. Even in this case, it is in fact the responsibility of the electrician or end-user to configure or design the units to be connected in such a way that the correct conductors are contacted. However, by it being immediately apparent which conductors have which function, the probability of incorrect contacting can now be significantly reduced.

According to the present invention, a support rail for luminaires or electrical units is therefore proposed, which comprises:

a support rail profile that encloses an elongated receiving space, and at least one busbar arranged in the receiving space, said busbar having contactable conductors, wherein the support rail has display means on its outside for the visual display of the function of the conductors.

It is here preferably provided that the display means can be changed for at least a portion of the conductors. According to this preferred development of the invention, within the scope of the flexible usage of the various conductors, the representation of the function of the conductors may thus be adapted at any time to the desired configuration of the system. By contrast, further conductors, whose function and arrangement are fixedly predefined, such as e.g. conductors for supplying power and/or grounding, are ideally likewise visually represented with regard to their function, wherein in this case the display means, however, preferably cannot be changed. The adaptation of the display means can thus preferably be limited primarily to those conductors whose function can actually be flexibly selected by the user.

Thereby, the display means according to the invention can here be embodied in a wide variety of ways. For example, a first conceivable variant thereby exists in that the display means comprise fields for applying labels, which then in each case explain the function of the associated conductor or conductors. The fields may thereby be designed to receive self-adhesive, self-bonding or magnetically attachable labels. It would also be conceivable to use fields taht are designed to receive replaceable display elements, for example, plates or cards with a corresponding inscription. The display means thereby preferably comprise a schematic representation of the arrangement of the conductors, wherein a field is in each case associated with at least a portion of the conductors.

A further possibility for embodying the display means according to the invention is to display the function of the conductors electronically. In this case, the display means may, for example, comprise a display that opens up the possibility of adapting the representation of the function of the conductors to their intended use in a particularly comfortable manner. In this instance as well, the representation of the function of the conductors is preferably combined with a graphical schematic representation of the arrangement of the conductors in the support rail, since here the position and associated function of the conductors is particularly intuitively apparent.

In the instance of an electronic representation of the function of the conductors, it can also be provided that the system, in particular the support rail, has means that automatically recognize the function of the conductors and then controls the display means in a corresponding manner.

As already mentioned, the function of the conductors should be apparent at all times. It is therefore preferably provided for the corresponding display means to be attached to the outside of the system. According to a first preferred variant, it is thereby provided for the display means to be arranged on an end-face part terminating the support rail profile. For example, it would thereby also be possible to provide a plurality of end-face parts, for example differently printed end-face parts, wherein that end-face part which corresponds to the selected use of the conductors is then picked by the user. An arrangement of the display means on the outside of a side wall of the support rail profile would also be conceivable, wherein, here as well, the arrangement preferably takes place in the end region of the support rail, in particular at the end at which power is supplied to the system.

Ultimately, with the aid of the solution according to the invention, it is thus ensured that, upon luminaires or electrical units being connected to a support rail system, it will be immediately apparent which functions the various conductors of the system perform, and in which way the units to be connected must be designed or configured in order to contact the conductors required for using certain functions.

BRIEF DESCRIPTION OF THE DRAWINGS

The invention is explained in more detail in the following using the accompanying drawings. The following are shown.

DETAILED DESCRIPTION

Figure 5:
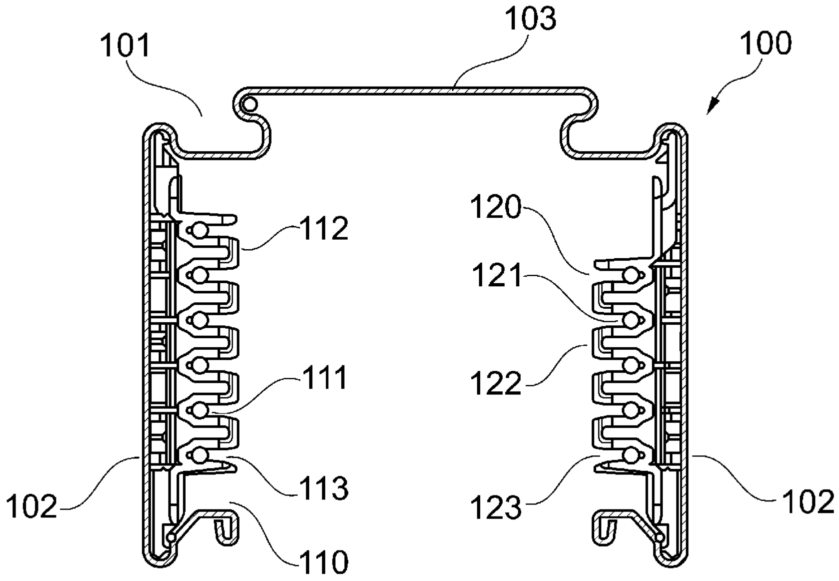
Fig. 5 Prior art
FIGS. 5-8 views of a support rail system known from the prior art.
Figure 6:
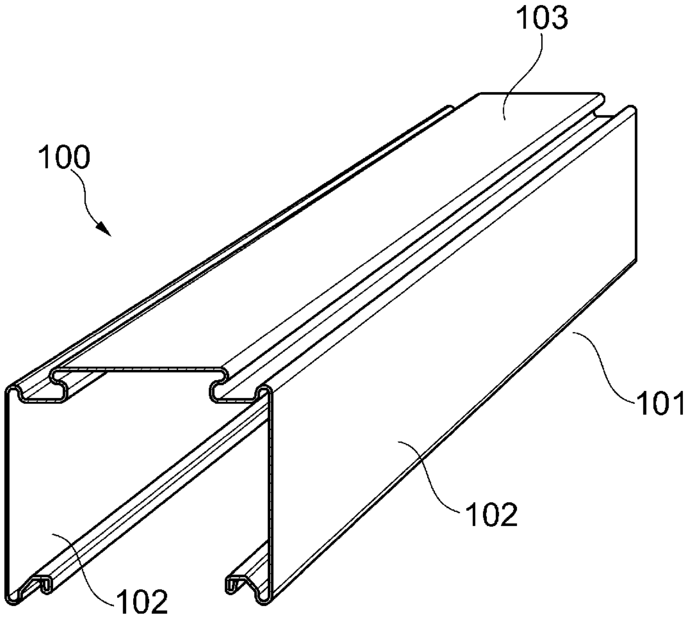
Fig. 6 Prior art
Figure 7:
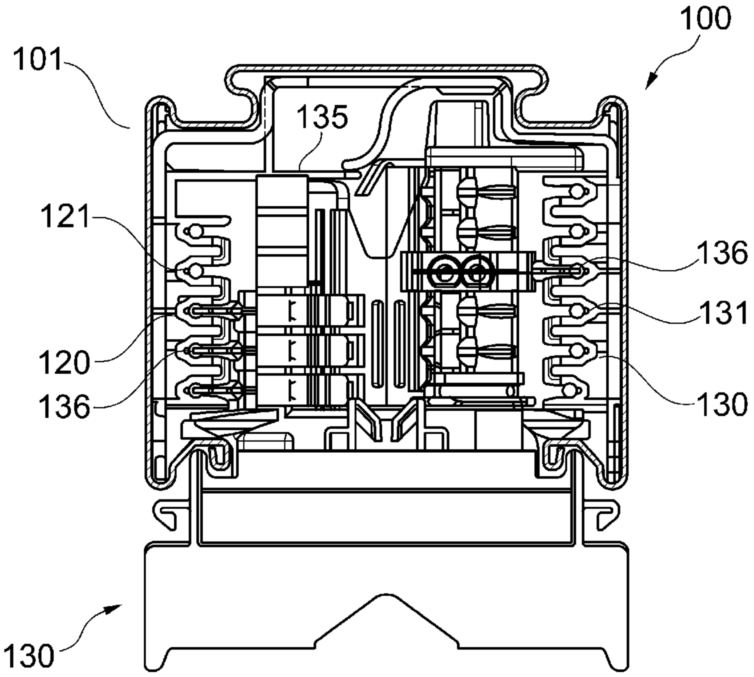
Fig. 7 Prior art
Figure 8:
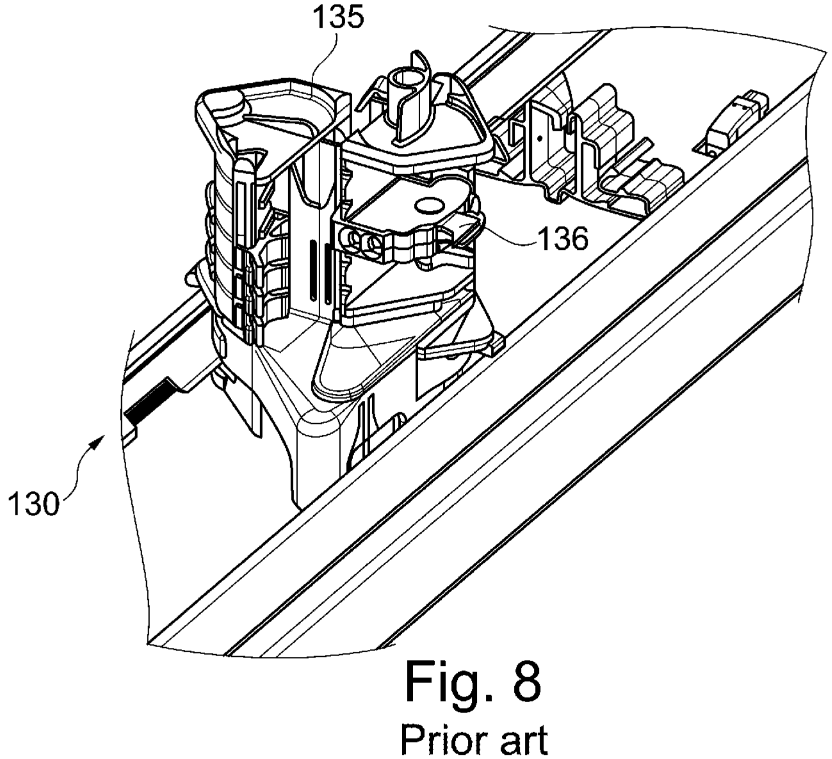
Fig. 8 Prior art

As already mentioned, the present invention represents, for example, a development of the known "TECTON" system. Before the solution according to the invention is to be described in more detail, the basic design of such a support rail system will be explained below with reference to FIGS. 5-8. FIGS. 5 and 6 thereby show views of the support rail in which the busbars are arranged. FIGS. 7 and 8 in turn show the embodiment of a luminaire connected to or to be connected to this support rail system with a contacting element provided for this purpose.

It is here initially apparent that, given the known support rail system 100, an elongated support profile rail 101 that is U-shaped in cross-section and downwardly open is used, which delimits an elongated receiving space with its two side walls 102 and the upper connecting wall 103, said receiving space being accessible from the underside via an elongated coupling opening. In the case shown, a so-called busbar 110 or 120 is then in each case arranged on the inner sides of both side walls 102 (these are not visible in FIG. 6, which only shows the support profile rail 101), which busbar in each case has a plurality of wires or conductors 111, 121 running in the longitudinal direction, said wires or conductors being arranged in longitudinal channels or grooves 113, 123 of a conductor receiving structure 112, 122 consisting of an insulating material. The channels 113, 123 thereby ensure a safe mounting of the conductors 111, 121 such that they cannot be touched inadvertently. At the same time, however, the channels 113, 123 are in each case designed to be open towards the interior of the support profile rail 101, so that a contacting of the conductors 111, 121 is enabled.

A luminaire 130 to be connected to this support rail system 100 then has at least one rotatably mounted contacting or tapping element 135, as can be seen in particular in FIGS. 7 and 8. To connect the luminaire 130, it is attached from the underside to the elongated support profile rail 101, wherein the contacting element 135 is thereby inserted into the support profile rail 101 via the elongated coupling opening and is then rotated by approximately 45°. Contacts 136 arranged on the contacting element 135 are thereby designed in such a way that they are pivoted out to the side by the rotation and thereby—as can be seen in particular in FIG. 8—engage in the receiving channels 113, 123 of the two busbars 110, 120, in order to contact the corresponding conductors 111, 121.

In the case shown, contacts 136 are arranged on both sides of the contacting element 135 to enable contacting of the busbars 110, 120 positioned on the two side walls 102 of the support profile rail 101. In that the contacts 136, with their associated contact holder part 137 and the cable (not visible) connected thereto, can be displaced vertically with respect to a contact holder body 138 of the tapping element 135, they can be arranged corresponding to the position of a desired conductor 111, 121, in order to then contact this corresponding conductor as desired. The possibility thereby exists, on the one hand, of a phase selection along with a selection of the neutral conductor for the power supply. Depending on the number of conductors made available by the busbars 110, 120, said conductors can then also be used for other purposes such as, for example, for communication. The possibility thereby exists of combining the lighting units connected to the support profile rail 101 to form a larger light strip system, and of controlling the lamps centrally from a central control unit.

Moreover, in addition to the lighting units shown in the figures, other electrical units may also be connected to the support rail system. In particular, sensors such as e.g. presence or brightness sensors that support an automated operation of the illumination system would hereby be conceivable. Units that enable a communication or transmission of data for other purposes, independently of the lighting controller, would also be conceivable as useful units to be connected to the support rail system. Finally, the most varied luminaire types are also conceivable that may be connected together to the support profile rail and thereby fulfill different tasks of the lighting technology.

In the illustrated system known from the prior art, some of the connection contacts are positioned at a predetermined height, since they are in principle intended to contact a specific conductor of the busbars 110, 120, for example the conductor provided for grounding. However, at least one contact can be positioned so as to be height-adjustable at the contacting element 135, since a phase selection for the power supply is to be performed via this contact. Depending on the height at which the corresponding connection contact is located, a different conductor and thus a corresponding phase of the power supply network is contacted, which thus opens up the possibility of assigning luminaires, for example, to different groups that are respectively connected to a specific phase of the supply voltage.

Developments of the support rail system illustrated increasingly have more and more conductors, since these systems are also intended to fulfill additional tasks, in addition to illumination alone, and/or the control of the connected luminaires is to be designed more flexibly and more conveniently. For example, it would be conceivable to use two conductors of the busbars for general data transmission, for example by means of a PLC, in order to realize a communication network that extends across the field of the entire busbar system. At certain positions, electrical loads in the form of routers or so-called access points could thus be connected, which then, on the one hand, communicate with a central communication device via the conductors of the busbars, and on the other hand provide an interface for a wireless communication with terminal devices. Another possibility in turn is to use two conductors of the busbars for digital transmission of audio and/or video information. In particular, so-called ELA loudspeakers or other playback devices that reproduce the corresponding acoustic information or visual information could then be connected to the corresponding conductors at desired positions. Finally, it would also be conceivable to use conductors to realize emergency power supply circuits. Individual luminaires of the system could then be connected to these conductors, in order to ensure a certain minimum lighting, based on the emergency power supply, in the event of an emergency.

Figure 1:
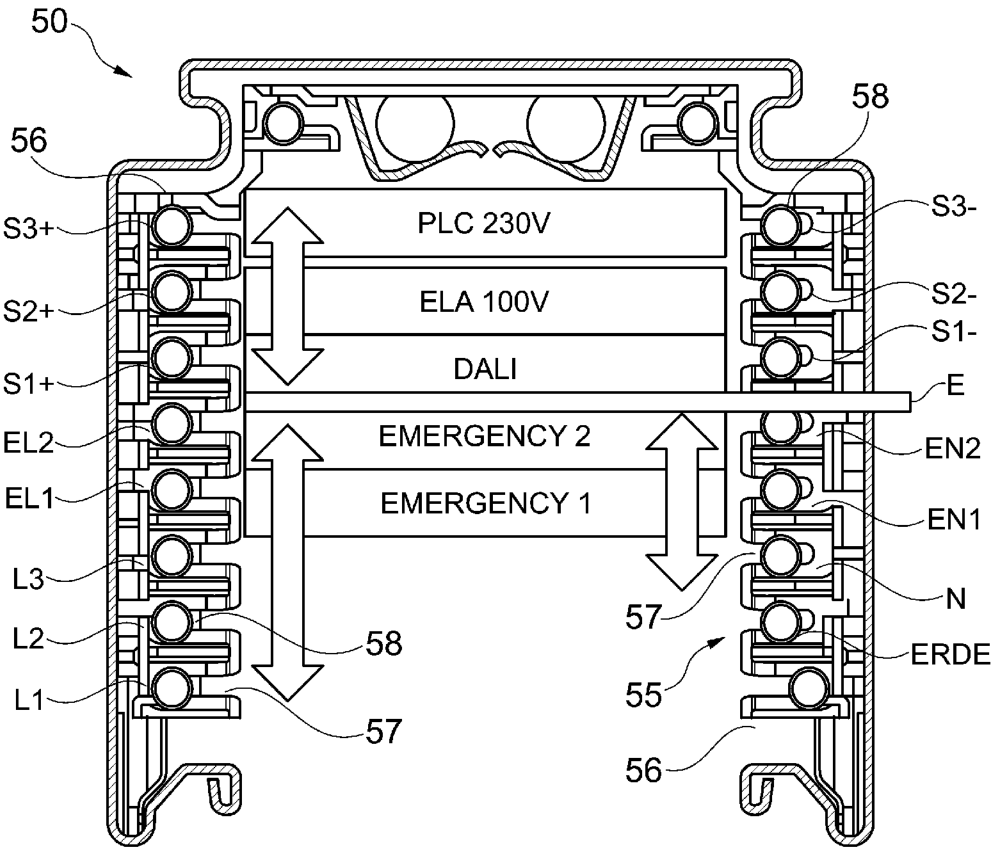
FIG. 1 schematically, a representation of a support rail with busbars arranged therein, to whose conductors different functions may be assigned, at least in part.

FIG. 1 now shows a possibility for realizing a system with expanded functions, designed in the manner described above. A support rail profile 50 with a plurality of conductors 58 running therein in the longitudinal direction is thereby shown in cross-section, said conductors being arranged—just as in the prior art—in grooves or channels 57 of suitably designed, insulating conductor-receiving structures 56 of two busbars 55, said grooves or channels running in the longitudinal direction. The contacting of these conductors 58 should, in fundamental terms, thus take place with the aid of contacting elements in the same way as is also explained using FIGS. 5-8, which contacting elements are, for example, inserted—at least partially—from the underside into the support rail 50 and are then rotated in such a way that the associated connection contacts pivot outward and contact the corresponding conductors 58.

In the example shown in FIG. 1, it is provided that the conductors 58 of the two busbars 55 may be assigned to two basic categories. The conductors 58 below the schematically illustrated plane E thereby serve primarily to supply power to loads that are to be connected, in particular luminaires to be connected, whereas, by contrast, the conductors 58 above the plane E provide additional functions.

In the present case, it is provided in particular that the three lower left-hand conductors L1, L2, L3 form the three phases of a power supply network, whereas in contrast the two lower right-hand conductors Ground and N enable a grounding of connected units and, on the other hand, represent the neutral conductor of the power supply network. Situated above these five conductors are then conductors EL1, EN1—in respectively opposing pairs—of a first emergency power supply circuit "EMERGENCY F" and conductors EL2, EN2 of a second emergency power supply circuit "EMERGENCY 2".

In addition to lighting and emergency lighting, the additional functions of the system are provided by two respectively opposing conductors 58 above the plane E, wherein in the shown example a first conductor pair S1+, S1− forms a DALI bus via which a communication corresponding to the DALI standard, in particular for lighting control, can take place by means of digital signals. In contrast, the conductor pair S2+, S2− located above this forms an ELA 100V circuit, which may be used in particular for transmitting acoustic information and for connecting corresponding loudspeakers. Finally, a further conductor pair S3+, S3− is available, to which 230 V is applied and which however may now be used for a communication by means of power line carrier, independently of the lighting control.

Of course, the assignments shown in FIG. 1 merely represents an example for using the various conductors 58. It is quite conceivable that a user would want to use other functions, for example an additional DALI circuit or a second circuit for connecting ELA speakers or other playback devices. Since it is obviously not reasonable to provide separate conductor pairs in the busbars 55 for every conceivable additional function, it is provided that at least a portion of the conductors 58 be used in different ways depending on the intentions of the user. Since the conductors 58 themselves are normally all of identical design, they can in principle be used for any desired function, in other words both for a power supply and for a transmission of signals. Depending on which functions the consumer desires for the system, a specific conductor pair can then thus be coupled, within the scope of the external connection of the support rail, to a corresponding unit (a power supply unit, a central control unit for transmitting DALI signals, a unit for transmitting acoustic signals for ELA loudspeakers, and so on).

In other words, depending on how the conductors 58 of the system are coupled to external supply units or to other units, different functions may be assigned to these conductors 58.

In this case, however, the problem then arises that the units to be connected must be configured in terms of their connection contacts such that they then actually correctly contact the conductors 58 assigned to a particular function. In the event that all conductors 58 have a fixed function, this is not a serious problem, since the units—luminaires or other units—to be connected can already be so designed as such. With the now existing flexibility with regard to the use of the conductors 58 of the system, however, it is in principle necessary to configure the units to be connected in a suitable manner with respect to the arrangement of their connection contacts, in order to avoid defective contacting and damage, possibly resulting therefrom, to the system or the load. However, the problem then arises here that the function of the different conductors 58 of the system until now has not been readily apparent.

Figure 2:
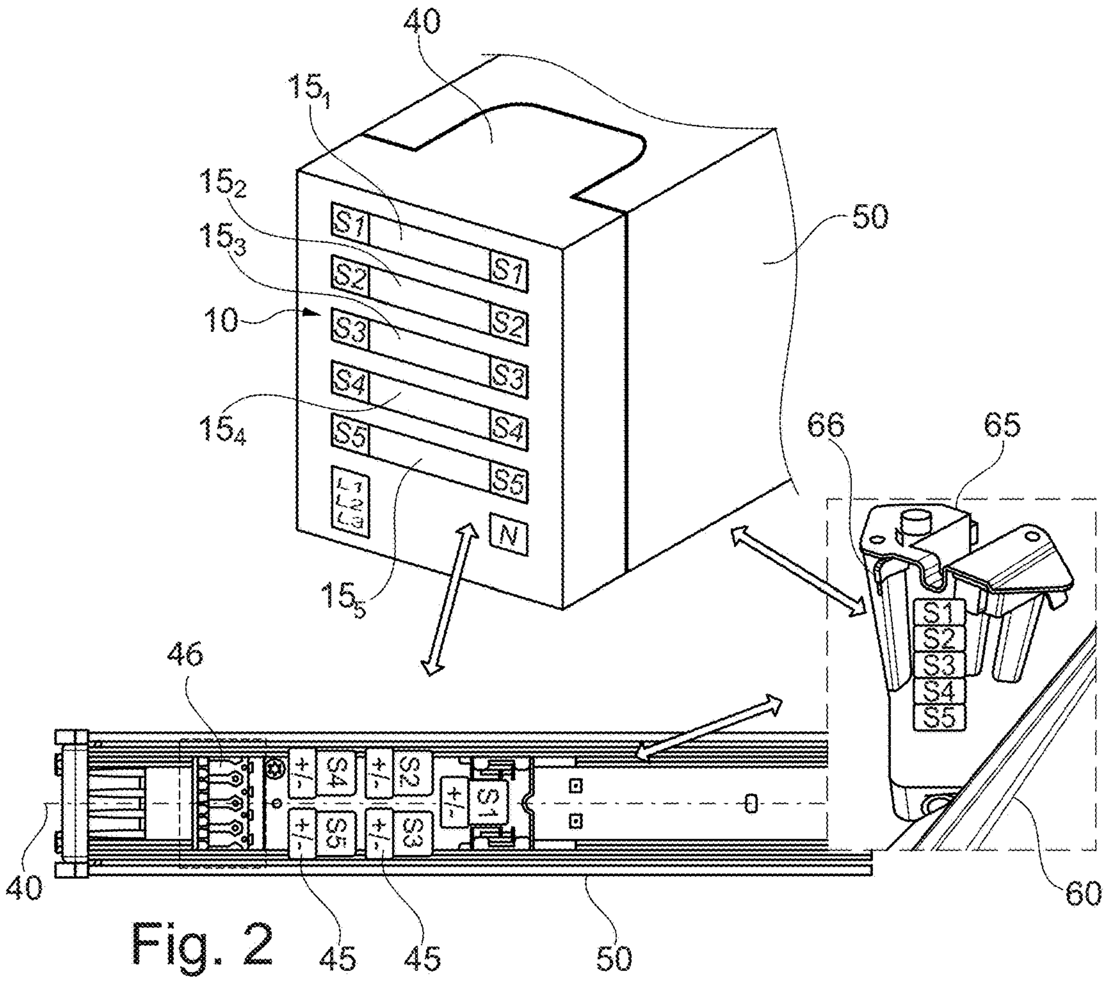
FIG. 2 an exemplary embodiment of a support rail according to the invention, the end-face part of which has display means according to the invention for showing the function of the conductors of the supporting rail.
Figure 3:
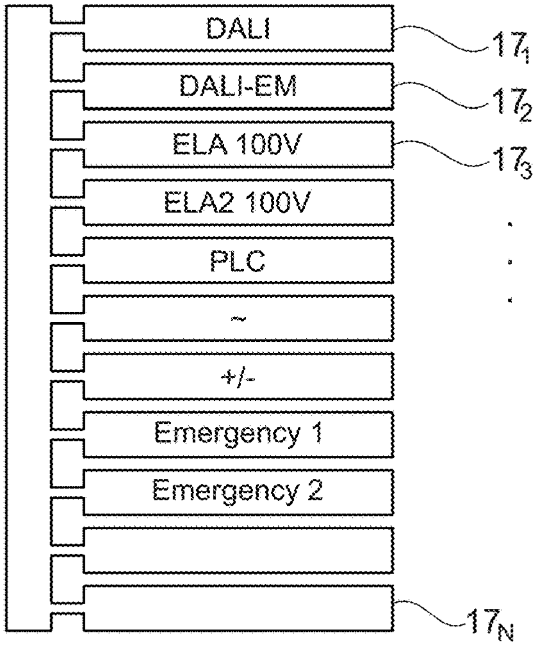
FIG. 3 a set of replaceable labels with whose aid the representation by the display means can be flexibly adapted.

FIGS. 2 and 3 therefore show a solution according to the invention by means of which the aforementioned problem is avoided, but at least markedly reduced. The end region of a support rail 50, which is terminated by an end-face part 40, is thereby illustrated schematically. Typically, the so-called incoming supply takes place in this end region of the system, meaning that the conductors 58 of the busbars 50, said conductors running within the support rail 50, are connected via corresponding connection elements 45 and contact terminals 46 to external cables that then lead to power supply units or other units for communication or data transfer. Depending on the manner in which the internally running conductors 58 are connected to the external connection lines, the function of the conductors 58 of the busbars 50 is then fixed and a connection element of a unit to be connected must be configured as regards its connection contacts, such that in each case the desired conductors 58 can be contacted. In particular, this requires that, for example in the connection element 65 (shown in FIG. 2) of a unit 60 to be connected, which is comparable to the known rotatable connection element of FIGS. 7 and 8, the connection contacts 66 be arranged correctly at a corresponding height.

In order to facilitate this process of configuring the units 60 that are to be connected, it is provided that the system provides display means 10 via which it is immediately apparent which function the various conductors 58 of the system have.

In the exemplary embodiment shown in FIG. 2, these display means 10 are located on the end-face part 40, ideally in the area of the incoming supply of the support rail 50, and can thus be recognized at any time by an electrician or the user who wants to connect units to the system.

In the exemplary embodiment shown, the display means 10 initially comprise a schematic representation of the available conductors 58, wherein the positioning of the display means 10 on the end-face part 40 is in this case advantageous insofar as the selected representation corresponds to a cross-sectional presentation of the support rail 50, and thus the arrangement and position of the different conductors 58 are intuitively apparent to a user. Analogous to the arrangement of the conductors 58 within the support rail 50, the eight conductors of the left-hand busbar 50 are thus shown with the aid of the display means 10 on the left-hand side; the conductors of the right-hand busbar 50 are shown on the right-hand side, wherein the representation of the grounding conductor may—as shown—possibly also be omitted.

The conductors used for the power supply (including phase selection and neutral conductor) and for grounding are fixedly assigned in the exemplary embodiment shown, and their position should normally not be changeable. In this case, the function of these corresponding conductors is directly represented with the aid of the display means 10 and also cannot be changed.

In contrast, the conductors of the conductor pairs situated above them may be flexibly assigned in terms of their function by the user in accordance with the idea stated above, wherein, according to a particularly preferred embodiment of the invention, the display means 10 are now designed in such a way that they are variable or adaptable in order to indicate the actual selected function of the conductors. In the exemplary embodiment shown, for this purpose it is provided that a field $\mathbf{15}_1$ to $\mathbf{15}_5$ be provided in each case between two opposing conductor pairs, which field may be used for the flexible representation of the respective used function of the corresponding conductor pair.

A conceivable exemplary embodiment is to thereby provide, corresponding to the illustration in FIG. 3, a set of card-like or plate-like display elements or labels $\mathbf{17}_1$ to $\mathbf{17}_N$ on which the fields $\mathbf{15}_1$ to $\mathbf{15}_5$ may be arranged. Thereby, the cards $\mathbf{17}_1$ to $\mathbf{17}_N$ have for the most part predetermined labels, and may then optionally be arranged in the different fields $\mathbf{15}_1$ to $\mathbf{15}_5$. For special functions, blank cards may also be used, which are then inscribed or printed accordingly within the scope of the installation of the system and may be analogously arranged in the associated field $\mathbf{15}_1$ to $\mathbf{15}_5$.

In the solution shown, the fields $\mathbf{15}_1$ to $\mathbf{15}_5$ and the affixable labels $\mathbf{17}_1$ to $\mathbf{17}_N$ may be designed such that the labels $\mathbf{17}_1$ to $\mathbf{17}_N$ are, for example, self-adhesive, self-bonding, or can be magnetically fastened to the fields $\mathbf{15}_1$ to $\mathbf{15}_5$. As an alternative to this, it would also be conceivable to design the fields $\mathbf{15}_1$ to $\mathbf{15}_5$ in the form of pockets or receptacles into which corresponding card-like or plate-like labels $\mathbf{17}_1$ to $\mathbf{17}_N$ may be inserted. It is essential that the user has the possibility to visually display the actual use of the conductors 58 of the system in order to prevent errors as much as possible during subsequent connection of loads.

Furthermore, it thereby does not necessarily need to be provided that the display means 10 be designed to be variable. It would also be conceivable, as a simple alternative, to provide a plurality of differently designed, for example differently printed, end-face parts that in each case represent a different assignment of the conductors. Upon installation of the system, that end-face part whose representation corresponds to the actual assignment of the conductors can then be selected by the user and arranged on the support rail.

In the exemplary embodiment shown, it is provided that a field 15$_1$ to 15$_5$ is in each case assigned to a pair of two opposite conductors. This usually makes sense, since primarily conductor pairs are required for the use of the different functions. In principle, however, within the scope of the present invention, it would also be conceivable, of course, to display the function of the conductors in each case individually with the aid of the display means 10. In addition, it is of course also not necessary, as described above, for the conductors used for the power supply to be fixedly assigned in terms of their arrangement, and here for the representation of the display means 10 to be unchangeable. However, it is altogether advantageous if these conductors, which are indispensable to the basic function of the overall system, cannot be changed with respect to their arrangement, which then will preferably also apply to the corresponding representation with the aid of the display means according to the invention.

In addition, it is to be noted that the arrangement of the busbars 50 with their conductors 58 can also be realized in another way within the support rail 50. In this case as well, an optimally intuitive representation of the function of the conductors 58 with the aid of the display means 10 can, of course, then be effected in the manner according to the invention.

Figure 4:
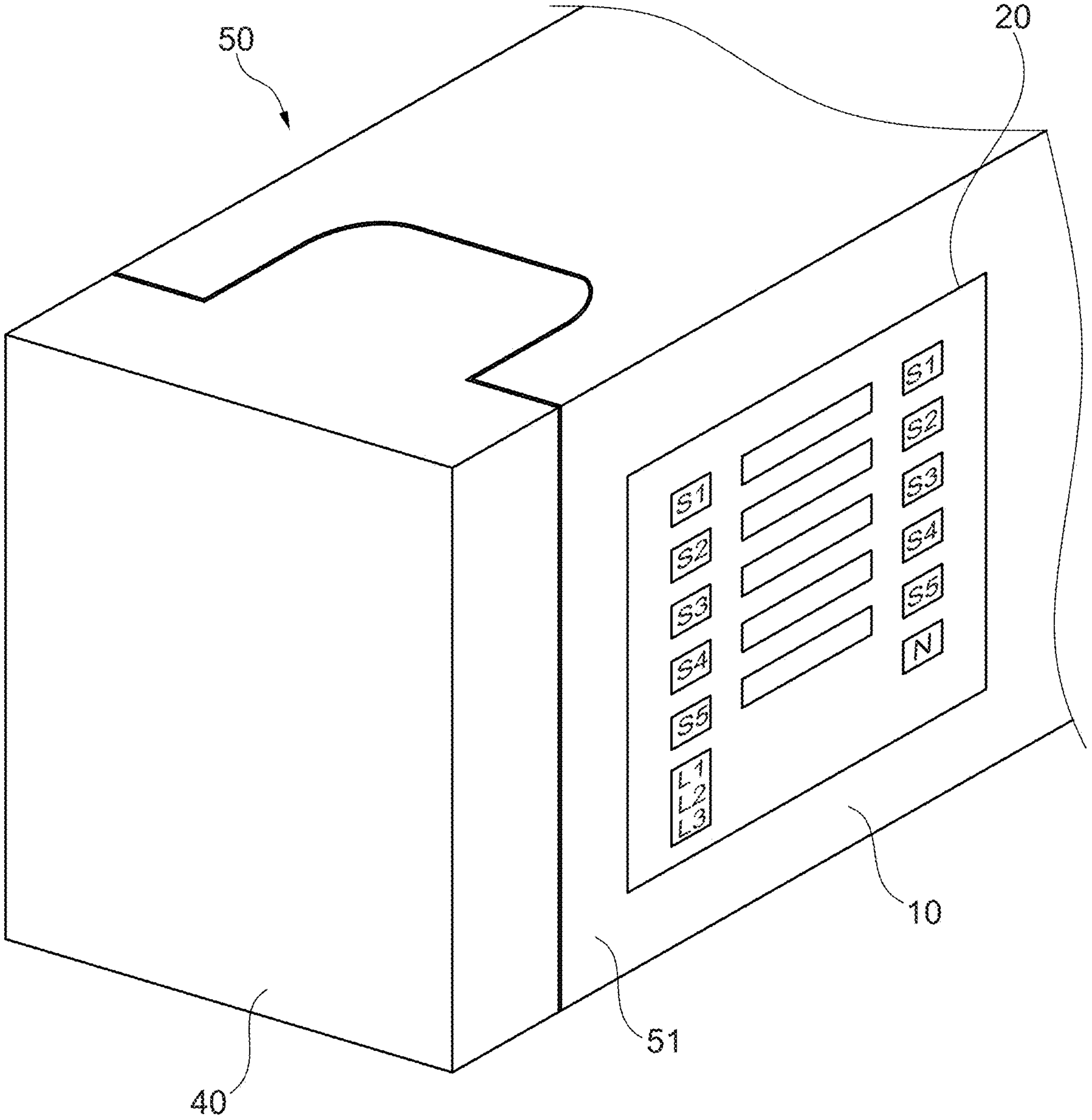
FIG. 4 a schematic representation of the electronic display means according to the invention.

A further possibility for realizing the idea according to the invention is shown in FIG. 4. Here, for the visual representation of the function of the conductors, an electronic variant that comprises a display 20 that is arranged on the outside of a side wall 51 of the support rail 50 is selected. Analogous to the illustration according to the exemplary embodiment of FIG. 2, here as well a schematic representation of the arrangement of the conductors is preferably provided, wherein then the additional display of the function of the different conductors is now performed electronically.

The display 20 may be designed in a wide variety of ways, and is preferably designed such that there is a minimum power consumption. In particular, the use of displays as known from e-readers or comparable devices whose presentation is based on a so-called electronic ink would be conceivable. Of course, a corresponding display 20 could also be arranged on the end-face part 40 of the system and, in an analogous manner, the display means 10 explained with reference to FIG. 2 could also be provided on a side wall 51 of the support rail 50. In principle, however, it is advantageous if the display means 10 are arranged in the end region of a support rail 50, in particular in the vicinity of the region in which power is fed into the system also, since here the corresponding adaptation of the display means 10 according to the invention can also take place directly as part of connecting the support rail 50 to the external lines.

Usually, the corresponding adaptation of the display means 10 is performed manually by a user, wherein this also applies to the digital variant according to FIG. 4. In principle, however, it would also be conceivable to design the display means 10 in such a way that, by correspondingly tapping the voltage signals applied to the conductors 58, they automatically recognize how the conductors are used, and then automatically adapt the presentation of the display means 10 accordingly. Of course, this applies primarily to the variant explained using FIG. 4, in which the display of the function is effected electronically.

The solution according to the invention thus contributes to further increasing the flexibility of support rail systems, but thereby to preventing the risk of an incorrect contacting of the available conductors of the system.

The invention claimed is:

1. A support rail for luminaires or electrical units, having:

a support rail profile, which encloses an elongated receiving space:

a plurality of conductors running in a longitudinal direction within the support rail profile;

two busbars arranged in the receiving space, and each busbar having an insulated structure with longitudinal grooves that holds each of the conductors separately;

an incoming supply element mounted to the support rail profile and having contact terminals and connection elements to form electrical connections between the conductors held in the busbars and external cables leading to power supply units or communication or data transfer units, wherein contact terminals and busbars dedicated to power supply including phase selection and ground or neutral are permanently assigned, and other contact terminals and busbars are flexibly assigned in terms of function;

display means on the outside of the support rail profile for visually representing the function of the conductors, wherein the display means for the power supply terminals are not modifiable and the display means for the flexibly assigned contact terminals and busbars are modifiable.

2. The support rail according to claim 1 wherein the display means are arranged on the outside of a side wall of the support rail profile.

3. The support rail according to claim 1 wherein the flexibly assigned conductors in the busbars are located above the permanently assigned conductors in the busbars.

4. The support rail according to claim 1 wherein the flexibly assigned conductors in the busbars comprise multiple pairs of conductors with one conductor of the pair being in one busbars and the other conductor of the pair being in the other busbar.

5. The support rail according to claim 1 wherein additional contact terminals and conductors in the the busbars are permanently assigned and the display means for these additional contact terminals and conductors are not modifiable.

6. The support rail according to claim 1 wherein the display means for the flexibly assigned busbars comprises fields ($15_1$ to $15_5$) for attaching labels ($17_1$ to $17_N$) explaining the function of an associated conductor.

7. The support rail according to claim 6 wherein that the fields ($15_1$ to $15_5$) are designed to receive self-adhesive, self-bonding or magnetically attachable labels ($17_1$ to $17_N$).

8. The support rail according to claim 6 wherein the fields ($15_1$ to $15_5$) have receptacles for the replaceable reception of cards.

9. The support rail according to claim 6 wherein the display means is a schematic representation of the arrangement of the conductors, wherein, for at least a portion of the conductors, a field ($15_1$ to $15_5$) is assigned in each case to each conductor or to each conductor pair.

10. The support rail according to claim 1, wherein the display means comprises an electronic ink display.

11. The support rail according to claim 10, furhter comprising means for automatically detecting the function of the conductors, said means controlling the display means.

12. The support rail according to claim 1, wherein the display means are arranged on an end-face part terminating the support rail profile.

13. The support rail according to claim 12 wherein the end-face part is located on an ed of the support rail profile to which the incoming supply element is mounted.

* * * * *